July 17, 1928.

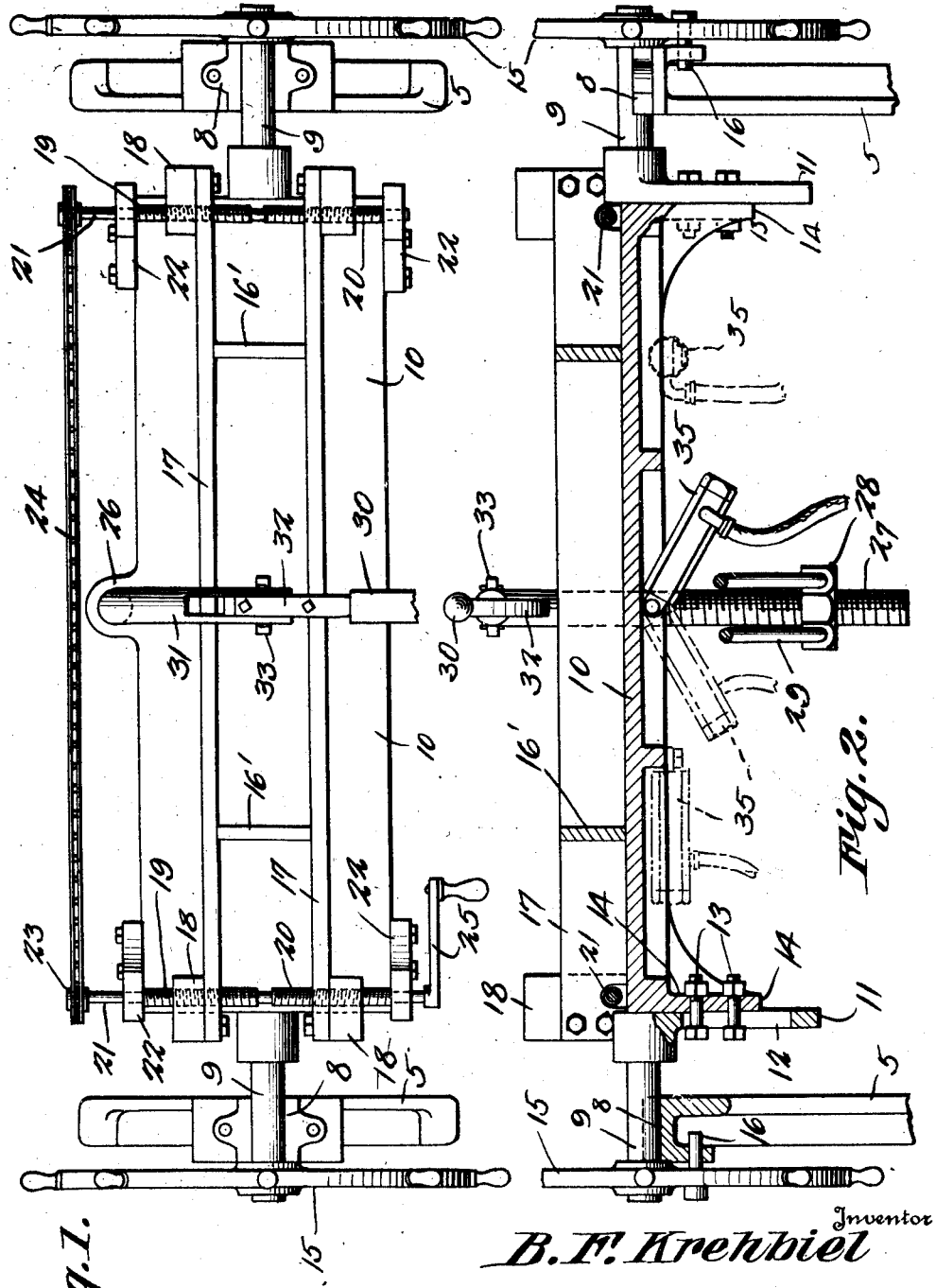

B. F. KREHBIEL 1,677,480

CONCRETE BLOCK MACHINE

Filed July 7, 1927    2 Sheets-Sheet 2

Inventor
B. F. Krehbiel

Patented July 17, 1928.

1,677,480

UNITED STATES PATENT OFFICE.

BENJAMIN F. KREHBIEL, OF WICHITA, KANSAS.

CONCRETE-BLOCK MACHINE.

Application filed July 7, 1927. Serial No. 204,106.

This invention has reference to an apparatus especially designed for use in the molding or construction of concrete blocks or the like articles, the primary object of the invention being to provide a machine which is adjustable for use in molding blocks or articles of various sizes, the adjusting mechanism for adjusting the side plates of the mold being such as to permit the adjustment to be made with facility and accuracy.

Another important object of the invention is to provide a machine of this character which may be inverted, after the article has been formed so that the article may move from the mold by gravity onto a suitable carrier where it may be removed from the machine.

Another important object of the invention is to provide means for causing the mold or container into which the plastic material or semi-plastic material is being placed to rapidly vibrate, to the end that the material will be evenly spread throughout the area of the mold and will be caused to settle and become compact in the mold.

A still further object of the invention is to provide an adjustable presser head designed to contact with the pallet of the mold to force the plastic material into the mold and secure the pallet in position, while the mold is being inverted.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of an apparatus constructed in accordance with the invention.

Figure 2 is a longitudinal sectional view therethrough.

Figures 3, 4:
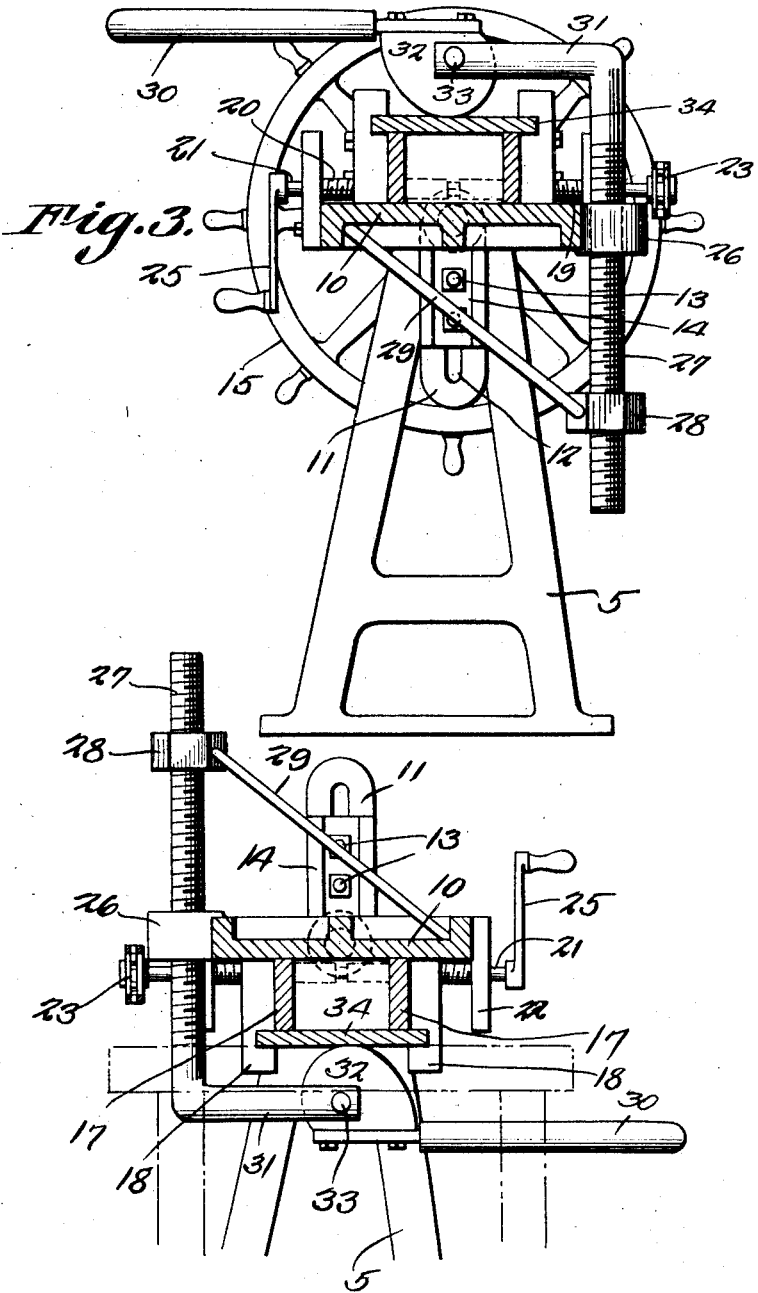
Figure 3 is a vertical sectional view through the central portion of the apparatus.
Figure 4 is a vertical sectional view illustrating the mold as inverted prior to removal of the article formed by the mold.

Referring to the drawings in detail, the apparatus includes uprights or end members indicated by the reference character 5 which are formed with bearings 8 at their upper ends in which the shafts 9 rest, the shafts being supplied with depending arms 11 at their inner ends. Elongated openings 12 are formed in the arms 11 and are designed to accommodate the bolts 13 that also pass through the depending arms 14 on the base plate 10 of the mold. Due to this construction it will be seen that the base plate 10 may be adjusted vertically with respect to the arms 11 and with respect to the shafts 9 so that the material may be supported below the shafts in such a way that the weight is evenly balanced to permit the mold to be easily rotated or inverted.

On the shafts 9 are operating wheels 15 which may be rotated by the operator to swing the mold from its upright position to its inverted position when the article has been formed. In order that the mold may be held in its upright or inverted position, a pin 16 is provided and passed through the operating wheel and into an opening of the end member associated therewith as clearly shown by the drawings. The mold also embodies end members 16' and side members 17 which have blocks 18 secured to the outer surfaces thereof at points adjacent to their ends, the blocks being provided with threaded openings, the threads of the blocks on one of the side members being disposed in a direction opposite to the threads of the opposite side to receive the oppositely disposed threaded portions 19 and 20 respectively of the shafts 21, that operate in bearings 22 secured to the outer edges of the base plate 10.

Sprockets 23 are secured to the shafts and are connected by means of the chain 24 so that movement of one shaft will produce a relative movement of the adjacent shaft to insure the simultaneous movement of the side members 17 towards and away from each other so that an adjustment may be made with facility and with a degree of accuracy.

An operating handle 25 is secured to one of the shafts so that upon rotation of the handle, the shaft may be rotated in a manner as described.

It might be further stated that owing to the construction of the side members 17 and manner of supporting the shafts, the side members are securely held against lateral movement by these shafts, eliminating the necessity of providing corner clamps or other clamping means for securing the side members in their positions of adjustment.

Arranged substantially centrally and extending from one side of the base plate 10, is an enlargement 26 formed with a threaded opening to receive the threaded shank 27 that also passes through the nut 28 supported by the rods 29 that have their upper ends secured to the underside of the base plate 10 thereby to brace the threaded shank 27 against twisting when pressure is brought to bear on the lever 30.

As shown, the upper end of the shank 27 is formed at right angles and extends inwardly overlying the upper portion of the mold proper as at 31, where the same is bifurcated to receive the presser head 32 which is pivotally connected to the right angled portion 31 by means of the pivot pin 33. This presser head 32 is in the form of an eccentric, to the end that the same may contact with the pallet 34 of the mold proper to force the pallet 34 downwardly into engagement with the material positioned within the mold, and at the same time, provide means for supporting the pallet 34 when the apparatus is inverted in the act of removing the molded article.

An important feature of the invention resides in the application of vibrators which in the present showing are indicated by the reference character 35, and which may be of any convenient type such as the type employing air, steam or electricity in its operation to rapidly vibrate the mold while material is being positioned therein or after the material has been placed in the mold, the member 35 being connected to the underside of the base plate or other suitable position.

It is also contemplated to position these vibrators adjacent to the center of the base plate or in positions as shown in dotted lines in Figure 2 of the drawings.

In the use of the device, the handle 25 is operated to rotate the threaded shafts 21 to adjust the side members 17 of the mold to the proper width. The end members of the mold are now positioned according to the length of the article to be made, and material is poured or placed between the side members 17, the vibrators of course being in operation to cause the material to evenly settle throughout the entire area of the mold.

After the material has been properly placed and has been properly tamped or pressed, the pallet 34 is positioned and the lever 30 operated to cause the head 32 to clamp the pallet 34 into close engagement with the side members.

The apparatus is now rotated to invert the mold, whereupon the lever 30 is moved to its inactive position and the pallet removed allowing the article to move by gravity onto a receiver of any suitable design, which may be positioned under the apparatus to receive the finished block or article.

I claim:

1. An apparatus for molding plastic material including supporting members having bearings, shafts resting in the bearings, arms on the shafts and having elongated openings, a base plate having depending arms formed with openings, bolts extending through the elongated openings and openings of the arms of the base plate to adjustably support the base plate, adjustable side members forming a part of the mold, a pallet for the mold and an adjustable pressing member contacting with the pallet to removably secure the pallet to the side members.

2. An apparatus for molding plastic material embodying an invertible mold including a vertically adjustable base plate, side members, threaded shafts operating through the side members for moving the side members towards and away from each other, said threaded shafts adapted to operate the side plates simultaneously, and means for exerting pressure on the material under operation.

3. A mold for molding plastic material embodying supporting members, shafts resting in the supporting members, a base plate supported between the shafts and adjustable with respect to the shafts, means for vibrating the mold, side members forming a part of the mold, and means operating above the mold for exerting a pressure on the material contained in the mold.

4. An apparatus for molding semi-plastic material embodying supporting members, shafts mounted on the supporting members, a vertically adjustable base plate supported by the shafts, laterally adjustable side members, means for adjusting the side members simultaneously, means for rotating the shafts to invert the base plate and side members to discharge an article therefrom, and a vertically adjustable clamping member for clamping a pallet over the side members.

5. An apparatus for molding semi-plastic material embodying supporting members, shafts mounted for rotation on the supporting members, a mold including a base plate mounted between the shafts, side members forming a part of the mold, a pallet to be positioned over the side members, a vertically adjustable shank arranged substantially centrally of the base plate and having a right angled extremity overlying the pallet, a cam pivotally connected with the right angled extremity, a lever for operating the cam, said cam adapted to be moved into engagement with the pallet to press the material and secure the pallet in position, and means for rotating the mold to invert the mold.

In testimony that I claim the foregoing as my own, I have hereto affixed my signature.

BENJAMIN F. KREHBIEL.